United States Patent [19]

Bostian et al.

[11] 4,218,429

[45] Aug. 19, 1980

[54] PRODUCTION OF ALKALI METAL DITHIONITES FROM SULFUR DIOXIDE, ALKALI METAL FORMATES, AND SLURRIED BISULFITE COMPOUNDS AT HIGH REACTANT CONCENTRATIONS

[75] Inventors: Logan C. Bostian, Virginia Beach; Charles E. Winslow, Jr., Norfolk, both of Va.

[73] Assignee: Virginia Chemicals Inc., Portsmouth, Va.

[21] Appl. No.: 906,583

[22] Filed: May 16, 1978

Related U.S. Application Data

[63] Continuation-in-part of Ser. No. 806,527, Jun. 14, 1977, abandoned.

[51] Int. Cl.$^2$ .............................................. C01B 17/66
[52] U.S. Cl. ................................................... 423/515
[58] Field of Search .......................................... 423/515

[56] References Cited

U.S. PATENT DOCUMENTS

| | | | |
|---|---|---|---|
| 3,897,544 | 7/1975 | Maeda et al. | 423/515 |
| 3,917,807 | 11/1975 | Yasue et al. | 423/515 |
| 3,927,190 | 12/1975 | Yoshikawa et al. | 423/515 |
| 4,127,642 | 11/1978 | Bostian | 423/515 |

*Primary Examiner*—Jack Cooper
*Attorney, Agent, or Firm*—Depaoli & O'Brien

[57] ABSTRACT

A batch process, in which a sodium bisulfite compound is the alkaline agent, is described for producing anhydrous sodium dithionite at high productivity by reduction of sulfur dioxide with the formate radical in concentrated aqueous methanolic solution. Minimum amounts of water, in which sodium formate is dissolved, and of methanol, in which sulfur dioxide is dissolved, are used. The process provides the optimum productivity of U.S. Pat. No. 3,887,695 while obviating the hazards and freeze-up difficulties that are inherent in forming and transferring a sodium hydroxide solution at 160° C. and also minimizes the amount of methyl formate formed at equilibrium after a large number of methanol recyclings.

14 Claims, No Drawings

PRODUCTION OF ALKALI METAL DITHIONITES FROM SULFUR DIOXIDE, ALKALI METAL FORMATES, AND SLURRIED BISULFITE COMPOUNDS AT HIGH REACTANT CONCENTRATIONS

CROSS-REFERENCE TO RELATED APPLICATION

This application is a continuation-in-part of Ser. No. 806,527, filed June 14, 1977, entitled "PRODUCTION OF SODIUM DITHIONITE FROM SULFUR DIOXIDE, SODIUM FORMATE, AND SODIUM CARBONATE WITH MINIMUM SOLVENT" of Logan C. Bostian et al, now abandoned.

BACKGROUND OF THE INVENTION

1. Field of the Invention

This invention relates to the production of anhydrous alkali metal dithionites from formates and sulfur dioxide. It specifically relates to production of sodium dithionite in an aqueous methanolic solution in which both sodium formate and sulfur dioxide are dissolved.

2. Description of the Prior Art

Hyposulfites, also termed hydrosulfites and more properly termed dithionites, are in demand as bleaching agents, such as for bleaching groundwood pulps. Zinc dithionite is being replaced by sodium dithionite because of the shortage and increasing cost of zinc dust to produce zinc dithionite and because of ecological objections to disposal of zinc-containing wastes. Sodium dithionite can be produced by electrolytic and borohydride procedures, but the most economical procedures for making a high-quality solid product increasingly use the formate radical as a means for reducing the valence of the sulfur atom in an aqueous methanolic solution within a pressure reactor while incrementally adding an alkaline formate, an alkaline agent, and sulfur dioxide.

This development can be analyzed as comprising two related streams of technology with respect to techniques for introducing the alkaline agent into the reactor: (1) sulfite-based and (2) hydroxyl/carbonate-based. Sulfite-based technology is believed to have originated in 1910 with British Pat No. 11,010 which teaches in two examples the addition of sodium pyrosulfite or sodium bisulfite to an aqueous alcoholic solution of sodium formate and formic acid while adding $SO_2$ thereto. No yields or productivities are furnished. It next appeared in 1968 as Japanese Pat. No. 7,003/68 which teaches in its Example 5 the addition of an aqueous slurry of sodium sulfite to $SO_2$-methanol solution in the reactor, a procedure which creates excessive acidity.

In 1973, British Pat. No. 1,322,250 taught the stagewise addition at 70°–150° C. of 10–75 percent by weight of the total sulfur dioxide to an aqueous methanolic solution containing all of the remaining reactants, followed by adding the remaining $SO_2$ at 60°–85° C., sodium bisulfite and sodium sulfite being exemplary alkaline agents in Examples 4 and 5.

The information in these five prior art examples is presented in Table I as three ratios based on unity, in addition to concentrations by weight of reactants within the reactor, for the sulfite-based technology. The $SO_2$ added includes the $SO_2$ in the alkaline agent.

TABLE I

Sulfite-based production of $Na_2S_2O_4$ by reduction of $SO_2$ with formate ion in aqueous methanolic solution

| Patent No. | Example No. | $CH_3OH$ fed $H_2O$ fed (parts) | Total $SO_2$ $H_2O$ fed (parts) | Total $SO_2$ HCOONa (equiv.) | Total Reactants Total Reactor Contents, Wt. % |
|---|---|---|---|---|---|
| British 11,010 | 2 | 5.05 | 0.53 | 1.92 | 27.7 |
| | 3 | 4.00 | 0.52 | 1.78 | 16.8 |
| Japanese 7,003/68 | 5 | 3.32 | 0.47 | 1.08 | 19.1 |
| British 1,322,250 | 4 | 3.76 | 1.03 | 1.14 | 32.0 |
| | 5 | 3.76 | 1.00 | 1.11 | 31.2 |

Hydroxyl/carbonate-based technology began in 1933 with U.S. Pat. No. 2,010,615 and continued, more than 30 years later, with a succession of improvements, particularly including U.S. Pat. Nos. 3,411,875; 3,576,598; 3,714,340; 3,718,732; 3,872,221; 3,887,695; 3,897,544; 3,917,807; and 3,927,190; Japanese Pat. Nos. 7003/68 and 2,405/71; and Belgian Pat. No. 698,247. Alternative use of sodium sulfite, bisulfite, and/or metabisulfite is also mentioned in several of these patents, particularly including U.S. Pat. Nos. 3,411,875; 3,897,544; 3,917,807; and 3,927,190.

These improvements generally comprise adding sulfur dioxide-containing methanol and an alkaline agent to an aqueous solution of an alkali metal formate and holding the resulting aqueous methanol solution at a reaction temperature above the dehydration point of the hydrated alkali metal dithionite in order to prevent the formation of crystals having water of crystallization occluded therewithin. The rate of addition must generally correspond to the rate of production of dithionite; if too rapid, the dithionite ion decomposes, thus reducing yield. The rate of addition therefore effectively controls productivity, measurable as weight of pure dithionite per unit of reactor volume per hour.

The information in 14 examples among these prior art patents is presented in Table II as three ratios based on unity for the hydroxide-carbonate based technology, in addition to the concentrations by weight of reactants within the reactor.

TABLE II

Hydroxide/Carbonate-based production of $Na_2S_2O_4$ by reduction of $SO_2$ with formate ion in aqueous methanolic solution

| Patent No. | Example No. | $CH_3OH$ fed $H_2O$ fed (parts) | Total $SO_2$ $H_2O$ fed (parts) | Total $SO_2$ HCOONa (equiv.) | Total Reactants Total Reactor Contents, Wt. % |
|---|---|---|---|---|---|
| U.S. | | | | | |

TABLE II-continued
Hydroxide/Carbonate-based production of Na₂S₂O₄ by reduction of
SO₂ with formate ion in aqueous methanolic solution

| Patent No. | Example No. | CH₃OH fed H₂O fed (parts) | Total SO₂ H₂O fed (parts) | Total SO₂ HCOONa (equiv.) | Total Reactants Total Reactor Contents, Wt. % |
|---|---|---|---|---|---|
| 3,576,598 | 1 | 4.32 | 2.11 | 2.26 | 44.5 |
| 3,887,695 | 1 | 4.32 | 2.18 | 1.50 | 45.0 |
|  | 2 | 4.32 | 2.18 | 1.71 | 43.8 |
| 3,897,544 | 1 | 3.00 | 0.73 | 1.17 | 28.4 |
|  | 2 | 3.00 | 1.02 | 1.16 | 35.1 |
|  | 3 | 4.00 | 0.71 | 1.16 | 31.3 |
|  | 5 | 3.00 | 0.73 | 1.00 | 28.4 |
| 3,917,807 | 1 | 3.84 | 1.02 | 1.13 | 31.6 |
|  | 2 | 3.84 | 1.02 | 1.13 | 31.6 |
|  | 3 | 3.84 | 1.02 | 1.13 | 31.6 |
| 3,927,190 | 1 | 4.47 | 1.05 | 2.13 | 28.6 |
|  | 2 | 4.25 | 1.00 | 2.13 | 28.0 |
|  | 3 | 4.72 | 1.11 | 2.13 | 28.8 |
|  | 4 | 4.25 | 1.00 | 2.08 | 28.6 |

U.S. Pat. No. 3,887,695 discloses a commercially valuable process that is highly advantageous with respect to productivity and simplicity. Its procedure for dissolving a mixture of NaOH and HCOONa in hot water at high temperature and under pressure was adopted in order to obtain a highly concentrated solution in the reactor and because removing water from 73 percent NaOH would require very high temperatures (73 percent NaOH being an eutectic) and removing water from HCOONa would require storage under pressure to keep the material from boiling. It was discovered that the compromise of adding the two together resulted in efficient dissolving of the HCOONa and forming of an aqueous solution having a solids content of 68.5 percent.

However, in order to obtain optimum productivity, it is necessary: (a) to dissolve all solids, by heating a mixture of water, sodium formate, and sodium hydroxide to a temperature (160° C.) that is critical with respect to saturation and freezing-out of the alkali, and then (b) to transfer the very hot, saturated solution from a dissolving vessel to the reactor. For this reason, the process is subject to difficulties in large-scale industrial production because of freeze-ups within supply pipes to the reactors from slight temperature drops.

The hot solution, moreover, is highly corrosive. Hot NaOH requires nickel, while hot formate requires stainless steel. Corrosion of metals by the solution is also harmful to the process, since small amounts of nickel and iron act as poisons. Zirconium tubing and a Teflon-lined tank were found to furnish satisfactory protection. Nevertheless, potential hazards from corrosion of equipment by the hot alkali and spraying of hot alkaline solutions upon operating personnel are always present.

A carbonate-based process is disclosed in the parent application that obviates the hazards and the freeze-up difficulties that are inherent in forming and transferring a sodium hydroxide solution at 160° C., while operating at similar high reactant concentrations, by adding dry sodium carbonate to methanol while an SO₂-methanol stream and an aqueous sodium formate stream are being fed thereto. It achieves a productivity of 0.68 pounds of pure Na₂S₂O₄ per gallon of reactor volume per hour, comparable to the productivity of the process of U.S. Pat. No. 3,887,695.

This carbonate-based process creates a draw-back with respect to evolution of methyl formate because approximately three times as much of this highly volatile compound is produced when using sodium carbonate as the alkali metal compound as compared to using sodium hydroxide. In consequence, additional condenser and scrubber capacity must be added to the system. It is therefore desirable to be able to use a process in which an alkali metal compound is added that produces minimum quantities of methyl formate.

In the hydroxide-based technology of the prior art, it is theoretically possible to obtain 40-50 percent increased productivity by reducing water to a minimum in the reaction. In practice, attempts to do this always resulted in pronounced decomposition of dithionite. Apparently, the reaction rate at 83° C. is simply not great enough to consume that extra formic acid, which therefore causes high acidity and decomposition. A second effect of using the minimum amount of water in the caustic process is that the by-product Na₂S₂O₃ tends to precipitate from the filtrate. Because the precipitated Na₂S₂O₃ is in the form of very fine needles, it causes the product to be very difficult to filter. It is accordingly highly desirable to determine the exactly optimum amount of water that should be added, preferably expressed as a useful range of ratios of methanol to water.

SUMMARY OF THE INVENTION

It is accordingly an object of this invention to provide a commercially controllable formate reduction process for dithionite production in which the concentration of reactants is sufficiently high that the process is characterized by high production per unit of reactor volume per hour.

It is also an object to provide a process for the production of anhydrous alkali metal dithionites from sulfur dioxide and formates in which a highly concentrated alkali metal source is supplied to the reactor without hazards to personnel and/or equipment or freeze-up difficulties.

It is additionally an object to provide a process in which the equilibrium concentration of methyl formate in recycled methanol is at a minimum level after many recyclings.

It is further an object to determine the optimum amount of water to be used in the reaction.

In accordance with the principles and objectives of this invention, a process is provided for preparing alkali metal dithionites within a fixed reactor volume by adding to a recipient methanol solution and reacting: (1) sulfur dioxide which is dissolved in methanol, (2) an alkali metal formate which is dissolved in water, and (3)

an alkali metal bisulfite compound which is slurried in methanol. The methanol and the water are at a selected weight ratio, and the amount of water is slightly more than the minimum amount required for dissolving the alkali metal formate at maximum concentration and at elevated temperature.

The reason for adding more water than the minimum involves the avoidance of both decomposition of dithionite and co-precipitation of $Na_2S_2O_3$, i.e., both yield and filterability of product. With respect to yield, it was discovered by careful experimentation with varying amounts of reactants that the maximum productivity that can be achieved is 25-30 percent above the productivity of the caustic process. Therefore, productivity offers no incentive for removing all the water possible. With respect to filterability, it was found that the presence of a certain amount of extra water tends to keep the $Na_2S_2O_3$ in solution in the filtrate.

By alkali metal bisulfite compound is meant, throughout the specification and claims, an alkali metal bisulfite, its anhydride, or mixtures thereof; by sodium bisulfite compound is meant $NaHSO_3$, $Na_2S_2O_5$, or mixtures thereof. Alkali metal bisulfite compound does not include $Na_2S_2O_3$.

The process of this invention produces less methyl formate than the carbonate-based process of the parent application. The difference is indeed quite marked for the first reaction of a series of reactions using recycled filtrate. However, it has been found that satisfactory operation is feasible at higher methyl formate levels and is particularly satisfactory when the methyl formate reaches equilibrium after a large number of such recyclings. At equilibrium, the difference in methyl formate content within the reactor between this process and the carbonate process is much smaller but still significant. At equilibrium the following methyl formate concentrations have been measured:

|  | % $HCOOCH_3$ in Reaction Alcohol | % $HCOOCH_3$ in Filtrate |
|---|---|---|
| Caustic Process, Plant A average | 3.0 | 1.8 |
| Caustic Process, Plant B average | 3.5 | 2.0 |
| $Na_2CO_3$-based Process (pilot plant) | 11.0 | 6.5 |
| This invention (pilot plant) | 7.5–8.0 | 4.4–4.7 |

The quantities of sulfur dioxide, methanol, sodium formate, water, and alkali metal sulfite compound are preferably adjusted so that the fixed reactor volume is fully utilized. Each methanol solution preferably includes about 7.5 percent methyl formate, thus representing equilibrium recycle conditions. An additional amount of methanol is added to the reflux condenser to minimize loss of methyl formate and other byproducts. This additional amount is about 15 percent of the total methanol used.

The ratio of methanol to water by weight as it is used hereinafter, as a quotient divided by unity, is about 3.0 to about 5.2. The sulfur dioxide-to-methanol ratio on an equivalence basis is about 0.20 to 0.30, preferably 0.24–0.30. On a weight basis, the ratio of sulfur dioxide to water is about 1.7 to about 2.4, the preferred ratio being 1.8–2.2. On an equivalence basis, the ratio of sulfur dioxide to formate ion is about 1.3–1.7, preferably 1.4, and of sulfur dioxide to sodium formate is about 1.45–1.95. On a weight basis, the sodium carbonate is about 55 percent to 80 percent of the sodium formate and preferably at least 63%; on an equivalence basis, the $Na_2CO_3/HCOONa$ ratio is about 0.7–1.0.

On a sulfur dioxide molar basis, the efficiency is about 74–82 percent. On a sodium formate molar basis, the efficiency is about 65–70 percent. On a sodium carbonate molar basis, the efficiency is about 70–85 percent. On a basis of reactor volume, this process produces about 2.0 to 2.5 pounds per gallon and about 0.5–0.6 pounds per hour per gallon as its productivity.

It has particularly been ascertained that if all of the alkali metal compound or all of the sodium formate is added at once, the dust value and/or the yield are adversely affected. It is accordingly necessary to add $SO_2$-methanol solution, aqueous sodium formate solution, and a methanolic suspension of a sodium bisulfite compound to a methanol puddle solution, containing methyl formate in an equilibrium amount which is usually 4–8 percent, according to specific schedules which are proportioned to the rates of reaction of: (1) $Na_2S_2O_5$ with water to form $NaHSO_3$, (2) water and $SO_2$ with $HCOONa$ to form $HCOOH$ and $NaHSO_3$, and (3) $HCOOH$ and $NaHSO_3$ to form $Na_2S_2O_4$.

With respect to the formate radical, it is important to note that a comparative calculation of prior art results for $Na_2O$, on the basis of alkali Na versus total Na added, can be misleading for those examples (such as Example 4 in U.S. Pat. No. 3,897,544) wherein no caustic soda is added, all sodium being supplied by sodium formate. The reason therefor is that the process cannot be continued with recycle alcohol. To explain, the desired reaction requires one mol of formic acid and two mols of bisulfite:

$$HCOOH + 2NaHSO_3 \rightarrow Na_2S_2O_4 + CO_2 + 2H_2O$$

When one adds $SO_2$ to aqueous sodium formate as in Example 4 of U.S. Pat. No. 3,897,544, one produces two mols of formic acid for two mols of $NaHSO_3$:

$$2H_2O + 2SO_2 + 2HCOONa \rightarrow 2HCOOH + 2NaHSO_3$$

The extra formic acid must react with excess methanol to produce methyl formate. Otherwise, the excess formic acid would cause the hydrosulfite to decompose. The problem occurs when the methanol is recovered for the next batch. It will now contain much methyl formate, and could result in a run with severe decomposition if used according to Example 4 of U.S. Pat. No. 3,897,544 because of an excess of formic acid produced, which cannot be converted to methyl formate due to the latter already being present.

The formulations in the examples given hereinafter, in which sodium formate is balanced with either $NaHSO_3$ or $Na_2S_2O_5$, are based on the assumption that the methanol, containing methyl formate, will be recovered from a previous run so that the methyl formate which is added is neither consumed nor produced. The examples thus simulate normal commercial production in which the methyl alcohol is recycled over and over.

In virgin batches such as the demonstrative examples of the prior art, in which caustic soda is used, methyl formate is not fed. Formate ion must consequently be supplied entirely from $HCOONa$, and $NaOH$ must be correspondingly reduced.

As a result of this, the recycle formulations in the following examples cannot be literally compared with the virgin formulations of the prior art examples. For this reason, comparisons are hereinafter made on a basis of total sodium use.

In contrast to prior art experimentation with sodium bisulfite compounds for reducing sulfur dioxide with the formate radical in aqueous methanolic solution to produce anhydrous sodium dithionite, these results indicate that: (1) an optimum ratio of reactants and an optimum experimental procedure have been discovered for using a sodium bisulfite compound as the source of a substantial amount of added alkali and (2) such conditions have been combined with the high reactant concentrations of U.S. Pat. No. 3,887,695 to attain at least its optimum productivity without using its inconveniently highest dissolving temperature.

The invention attains this result by supplying the alkali metal bisulfite compound in as high a concentration as possible, preferably as a slurry in methanol, by minimizing the amount of water, which acts as the solvent for the alkali metal bisulfite compound and for the alkali metal formate, and by using nearly as low a ratio as possible of methanol to water, so that the alkali metal bisulfite compound is added in excess of its solubility in the water.

This invention is an improvement in the process for the reduction of sulfur dioxide with the formate radical in aqueous methanolic solution to produce anhydrous sodium dithionite by introducing an aqueous sodium formate solution, a sulfur dioxide-methanol solution, and a selected sodium bisulfite compound into a reactor to form a reaction mixture wherein, on an additive basis:

(a) the methanol-to-water weight ratio is 3.0–5.2;
(b) the $SO_2$-to-water weight ratio is 1.7–2.4; and
(c) the ratio of equivalents of $SO_2$ to equivalents of sodium formate is 1.45–1.95.

In a highly preferred embodiment, this process may be summarized as comprising the following steps:

(A) forming a sodium bisulfite compound in methanol within a dissolving vessel to provide at least a substantial proportion of the alkali needed for the reaction by adding sodium carbonate, preferably as a dry powder, to form a suspension, this sodium carbonate being 55–80% by weight of the sodium formate when used as 100% of the needed alkali, and dissolving sulfur dioxide in the methanol to react with the sodium carbonate and form the sodium bisulfite compound in suspension as a slurry, this sulfur dioxide being 0.5 to 0.9 of the total $SO_2$ used in the reaction;

(B) dissolving sodium formate in water at elevated temperatures and up to maximum concentration to form an aqueous formate solution;

(C) dissolving sulfur dioxide in methanol to form an $SO_2$-methanol solution; and (D) providing a recipient or puddle methanol solution within a fixed-volume reactor and adding thereto:
(1) the suspension of the sodium bisulfite compound in methanol and the aqueous sodium formate solution simultaneously according to a first specific schedule, and
(2) the $SO_2$-methanol solution according to a second specific schedule at progressively slower addition rates, commencing subsequently to the first specific schedule.

DESCRIPTION OF THE PREFERRED EMBODIMENT

The following examples illustrate the use of two sodium bisulfite compounds, one prepared in methanol outside of the reactor immediately before introduction thereinto and the other previously prepared and added to the reactor as a suspension in methanol. The key to the inventive contribution resides in: (a) the total water added to the reactor, (b) maintaining the methanol-to-water ratios previously set forth, and (c) preparing the alkali metal compound outside of the reactor so that the concentration of reactants within the reactor is high.

EXAMPLE 1

This example illustrates the pre-reaction of sodium carbonate and sulfur dioxide to form a sodium bisulfite feed material in situ within a portion of the methanol.

Three separate feeds were prepared. Feed "A" was made by suspending 83 parts by weight of sodium carbonate in 167 parts of methyl alcohol containing 9 parts methyl formate, and adding to the suspension 167 parts of sulfur dioxide. Feed "B" was made by dissolving 131 parts of sodium formate of approximately 96% purity in 93 parts water. Feed "C" was made by dissolving 35 parts sulfur dioxide in 35 parts methyl alcohol containing 2 parts methyl formate.

An initial charge consisting of 115 parts methyl alcohol containing 6 parts methyl formate was placed in the reactor. This charge was agitated and heated to a temperature of 65° C. and at a pressure of 20 psig. Then Feed "A" and Feed "B" were started simultaneously according to a first specific schedule so that the specified quantity of each would be fed to the reactor in at least a selected 60 to 80-minute period. Heating of the reactor contents continued until a temperature of 83° C. was reached, at which time the heat was reduced to maintain a controlled reaction temperature of 83° C. The time period from 65° to 83° C. was approximately 10 minutes. Also after this same 10 minutes, the reactor pressure had reached 50 psig owing to the release of carbon dioxide gas from the reaction. The reaction pressure was thereafter maintained at 50 psig by controlled release of the carbon dioxide formed in the reaction. The release gas left the reactor through first a water-cooled condenser (35° C.) followed by a chilled condenser (−10° C.), then a chilled scrubber fed with methyl alcohol at a rate of 0.26 part per minute. The condensate from the two condensers plus the effluent scrubber methanol both re-entered the reactor.

After the 60 to 80-minute period of adding Feeds "A" and "B" had been completed, the adding of Feed "C" was begun. Feed "C" was fed according to a second specific schedule of progressively slower addition within an additional 60 to 80-minute period.

The 80-minute schedule comprises an initial rate of 1.5 parts per minute for 15 minutes, a secondary rate of 1.0 parts per minute for another 15 minutes, and a final rate of 0.7 parts per minute for the remaining time. For a schedule of less than 80 minutes, the period of time for each of the three rates (1.5, 1.0 and 0.7 parts per minute) would be adjusted so as to complete the 72 parts of Feed "C" in the desired time; a 60-minute schedule, for example, would comprise 30 minutes at 1.5 parts per minute, 20 minutes at 1.0 parts per minute, and 10 minutes at 0.7 parts per minute.

In this example, the entire 72 parts of Feed "C" were consumed in 80 minutes. During this time, the temperature and pressure within the reactor were maintained at 83° C. and 50 psig, respectively.

These same conditions were maintained for an additional 70-minute period after the completion of Feed "C." At this time, 230 minutes from the beginning in all, the reactor contents were cooled to 60° C. and filtered. Then the filter cake was washed with 240 parts methyl alcohol and dried under vacuum to yield a crystalline product of 240.5 parts by weight and 92.3% assay as sodium hyposulfite. The data are shown in Tables III, IV, and V.

EXAMPLE 2

This example illustrates the use of sodium metabisulfite as a sodium bisulfite feed material.

Again, three separate feeds were prepared. Feed "A" was made by suspending 150 parts of sodium metabisulfite in 167 parts of methyl alcohol, containing 9 parts of methyl formate, and adding to the suspension 67 parts of sulfur dioxide. Feed "B" and Feed "C" were identical to those described in Example I.

The feed schedules, reaction conditions, and total reaction time were exactly as described in Example I. After filtering, washing, and drying as in Example I, a crystalline product of 238 parts by weight and 91.0% assay as sodium hyposulfite was obtained. The data are shown in Tables III, IV, and V.

EXAMPLE 3

This example illustrates the same reaction as Example 1, using the same feeds, addition schedules, temperatures and pressures, except that the methyl formate is within the equilibrium recycle range of 7.5-8.0 percent in the reaction alcohol. The feed information, using pure materials, is given in Tables III, IV, and V.

TABLE III

| | Materials Charged and Recovered | | |
|---|---|---|---|
| | | Examples | |
| MATERIALS | 1 | 2 | 3 |
| INITIAL CHARGE: | | | |
| $CH_3OH$ | 115 | 115 | 100 |
| $HCOOCH_3$ | 6 | 6 | 8 |
| Feed A - (SLURRY): | | | |
| $CH_3OH$ | 167 | 167 | 165 |
| $HCOOCH_3$ | 9 | 9 | 14 |

TABLE III-continued

| | Materials Charged and Recovered | | |
|---|---|---|---|
| | | Examples | |
| MATERIALS | 1 | 2 | 3 |
| $Na_2CO_3$ | 83 | — | 89 |
| $SO_2$ | 167 | 67 | 160 |
| $Na_2S_2O_5$ | — | 150 | — |
| FEED B: | | | |
| HCOONa | 131 | 131 | 117 |
| $H_2O$ | 93 | 93 | 106 |
| FEED C (Slow $SO_2$ Feed): | | | |
| $CH_3OH$ | 35 | 35 | 35 |
| $HCOOCH_3$ | 2 | 2 | 3 |
| $SO_2$ | 35 | 35 | 35 |
| SCRUB: | | | |
| $CH_3OH$ | 57 | 57 | 50 |
| PRODUCT: | | | |
| $Na_2S_2O_4$, as recovered | 240.5 | 238 | 227.3 |
| ASSAY, % | 92.3 | 91.0 | 90 |
| $Na_2S_2O_4$, 100% | 222 | 217 | 205 |

TABLE IV

| | Analysis of Materials Charged and Reocvered on a Weight Basis | | |
|---|---|---|---|
| | | Examples | |
| MATERIALS | 1 | 2 | 3 |
| $HCOOCH_3$ added, lbs. | 17 | 17 | 25 |
| $CH_3OH$ in $HCOOCH_3$, lbs. | 9 | 9 | 13 |
| $HCOO^-$ in $HCOOCH_3$, lbs. | 13 | 13 | 19 |
| $CH_3OH$ added, lbs. | 379 | 379 | 350 |
| Total $CH_3OH$ (added + in-$HCOOCH_3$), (lbs. | 388 | 388 | 363 |
| Water added, lbs. | 93 | 93 | 106 |
| $CH_3OH$ added/$H_2O$ added | 4.08 | 4.08 | 3.30 |
| $SO_2$ added | 202 | 203 | 195 |
| $SO_2/CH_3OH$ added | 0.64 | 0.64 | 0.56 |
| $SO_2$/Total $CH_3OH$ | 0.521 | 0.523 | 0.537 |
| $SO_2/H_2O$ added | 2.17 | 2.18 | 1.84 |
| HCOONa added, lbs. | 126 | 126 | 117 |
| $HCOO^-$ in HCOONa, lbs. | 83 | 83 | 78 |
| Total $HCOO^-$ (in-HCOONa + in-$HCOOCH_3$), lbs | 96 | 96 | 97 |
| $SO_2$/HCOONa | 1.603 | 1.611 | 1.665 |
| $SO_2$/Total $HCOO^-$ | 2.104 | 2.114 | 2.010 |
| $Na_2CO_3$ added, lbs. | 83 | — | 89 |
| $Na_2CO_3$/HCOONa | 0.659 | 0.663 | 0.760 |
| $Na_2S_2O_5$ added, lbs. | — | 150 | — |
| $SO_2/Na_2CO_3$ | 2.434 | — | 2.191 |
| $Na_2CO_3/H_2O$ added | 0.892 | 0.899 | 0.840 |
| HCOONa + ($Na_2CO_3$ or $Na_2S_2O_5$) + $SO_2$, lbs. | 411 | 479 | 401 |
| $CH_3OH$ + $H_2O$ + $HCOOCH_3$, lbs. | 431 | 431 | 481 |
| Reactant concentration, % | 48.8 | 52.6 | 45.5 |

TABLE V

| | Analysis of Materials Charged and Recovered on an Equivalent Basis | | |
|---|---|---|---|
| | | Examples | |
| MATERIALS | 1 | 2 | 3 |
| $CH_3OH$ in $HCOOCH_3$, eq. | 0.28 | 0.28 | 0.41 |
| $CH_3OH$ added, eq. | 11.83 | 11.83 | 10.44 |
| Total $CH_3OH$, eq. | 12.11 | 12.11 | 11.35 |
| Water added, eq. | 5.16 | 5.16 | 5.89 |
| $CH_3OH$ eq/$H_2O$ eq. (added) | 2.29 | 2.345 | 1.86 |
| $SO_2$ added, eq. | 3.153 | 3.169 | 3.047 |
| $SO_2$ eq./$CH_3OH$ eq. (added) | 0.267 | 0.268 | 0.279 |
| $SO_2$ eq./$CH_3OH$ eq. (total) | 0.260 | 0.260 | 0.268 |
| $SO_2$ eq./$H_2O$ eq. (added) | 0.611 | 0.614 | 0.517 |
| HCOONa eq. | 1.852 | 1.852 | 1.722 |
| $HCOO^-$ eq. in $HCOOCH_3$ | 0.289 | 0.289 | 0.4167 |
| Total $HCOO^-$ | 2.141 | 2.141 | 2.1889 |
| $Na_2CO_3$ eq./$Na_2S_2O_5$ eq. | 1.566 | 1.578 | 1.679 |
| $SO_2$/HCOONa eq. | 1.702 | 1.711 | 1.77 |
| $SO_2$/Total $HCOO^-$ eq. | 1.44 | 1.45 | 1.43 |
| $SO_2/Na_2CO_3$ eq. | 2.013 | 2.008 | 1.815 |
| $Na_2S_2O_5$ or $Na_2CO_3$ eq./HCOONa eq. | 1.183 | 1.174 | 0.975 |
| Molar efficiency, $SO_2$ basis | 80.9 | 78.6 | 77.3 |

TABLE V-continued

Analysis of Materials Charged and Recovered on an Equivalent Basis

| MATERIALS | Examples | | |
|---|---|---|---|
| | 1 | 2 | 3 |
| Molar efficiency, HCOONa basis | 66.2 | 64.7 | 68.2 |
| Molar efficiency, $Na_2Co_3$ basis | 81.4 | 79.6 | 70.0 |
| Productivity, lbs./hr./gal. | 0.58 | 0.57 | 0.54 |

EXAMPLES 4 and 5

As an illustration of the test reactions which were made to establish that simultaneous addition of all of the sodium compounds would inhibit yield or dust or both, Table VI gives data for two comparative examples in which sodium hydroxide was used as the alkali compound. In Example 4, the laboratory reactor was charged with:

424 g. NaOH (solid beads)
851 g. $CH_3OH$
38 g. $HCO_2CH_3$
41 g. $HCO_2Na$
22 g. $H_2O$ to form the initial puddle.

A solution of 787 g. of sodium formate (96 percent assay) and 610 g. of water was fed into the reactor over an 80-minute period. Simultaneously, the reactor was being fed with 81 percent of a solution consisting of 1702 g. methanol, 76 g. methyl formate and 1282 g. sulfur dioxide in what has been called the "fast feed" period. The remainder of the latter solution was then charged during the next 80 minutes or "slow $SO_2$ feed" period to provide an 81/19 split of the $SO_2$-methanol material, a ratio that had been previously determined to provide optimum dust values (minimum dust production). As a scrub, 450 grams of methanol were used.

TABLE VI

| | Examples | |
|---|---|---|
| Example No. | 4 | 5 |
| NaOH, g. | 424** | 424* |
| $H_2O$, g. | — | 155 |
| $Na_2CO_3$, g. | — | — |
| HCOONa (96%), g. | 787 | 787 |
| $H_2O$, g. | 610 | 455 |
| $CH_3OH$, g. | 1702 | 1702 |
| $HCOOCH_3$, g. | 76 | 76 |
| $SO_2$, g. | 1282 | 1282 |
| $CH_3OH$ (puddle), g. | 851 | 851 |
| $HCOOCH_3$ (puddle), g. | 38 | 38 |
| HCOONa (puddle), g. | 41 | 41 |
| $H_2O$ (puddle), g. | 22 | 22 |
| $CH_3OH$ (scrub), g. | 450 | 450 |
| $Na_2S_2O_4$, g. | 922 | 1429 |
| Assay, % | 77.3 | 90.9 |
| Pure $Na_2S_2O_4$, g. | 713 | 1299 |

*99% purity = 420 g. NaOH
73% solution
**solid beads

In Example 5, exactly the same procedure was used except that the 73 percent solution of NaOH was fed over a 60-minute period, simultaneously with the addition of the sodium formate solution.

Of major interest is the very low yield and low purity of the product for Example 4 as compared to Example 5. Similar comparative runs have been made to test the effect upon dust and/or yield of adding sodium formate all at once.

As has heretofore been stated, the novel process of this invention results in increased productivity for a given reaction vessel per unit of time. This increased productivity results from the fact that it is possible, using the teachings of this invention, to utilize more of the reactor volume for the production of sodium dithionite than has heretofore been possible.

Because it will be readily apparent to those skilled in the art that innumerable variations, modifications, applications, and extensions of the examples and principles hereinbefore set forth can be made without departing from the spirit and scope of the invention, what is herein defined as such scope and is desired to be protected should be measured, and the invention should be limited, only by the following claims.

What is claimed is:

1. In a process for the production of an anhydrous alkali metal dithionite by introducing as reagents aqueous sodium formate, a sulfur dioxide-methanol solution and a sodium compound into a reactor wherein,
   (a) the methanol-to-water weight ratio is about 3.0 to about 5.2;
   (b) the $SO_2$-to-water weight ratio is about 1.7 to about 2.4; and
   (c) the ratio of equivalents of $SO_2$ to the equivalents of formate is about 1.3–1.7, the improvement which comprises using a sodium bisulfite compound, selected from the group consisting of $NaHSO_3$, $Na_2S_2O_5$, and mixtures thereof, as said sodium compound by suspending said compound in a portion of said methanol to form a slurry and introducing the slurry to the reactor in an amount such that it is added in excess of its solubility in the water, allowing reagents to react, and recovering said anhydrous alkali metal dithionite.

2. The process of claim 1 wherein said sodium metal bisulfite compound is prepared by suspending sodium carbonate in said portion of said methanol and by pre-reacting said sodium carbonate with a portion of said $SO_2$ to form a slurry which is introduced into said reactor.

3. The process of claim 2 wherein said slurry is a slurry of $NaHSO_3$.

4. The process of claim 2 wherein said slurry is a slurry of $Na_2S_2O_5$.

5. The process of claim 2 wherein the sulfur dioxide-methanol solution contains methyl formate.

6. The process of claim 5 wherein the addition of said aqueous sodium formate solution takes place approximately simultaneously with the addition of said slurry.

7. The process of claim 5 wherein 80–85% by weight of said sulfur dioxide-methanol solution is pre-reacted with sodium carbonate to form the sodium bisulfite compound and wherein the remaining 15–20% is introduced within the second ⅓ of the total reaction time.

8. The process of claim 5 wherein methyl alcohol and methyl formate are placed into said reactor prior to introducing said sulfur dioxide-methanol solution, said aqueous sodium formate, and said slurry.

9. The process of claim 8 wherein the addition of said slurry takes place during approximately the first ⅓ of the time required for said reaction to produce said anhydrous alkali metal dithionite.

10. In a process for the reduction of sulfur dioxide with formate radical in aqueous methanolic solution to produce anhydrous sodium dithionite by introducing as reagents an aqueous sodium formate solution, a sulfur dioxide-methanol solution, and a sodium compound into a reactor to form a reaction mixture wherein, on an additive basis:
  (a) the methanol-to-water weight ratio is about 3.0 to about 5.2;
  (b) the SO$_2$-to-water weight ratio is about 1.7 to about 2.4; and
  (c) the ratio of equivalents of SO$_2$ to equivalents of sodium formate is about 1.45 to about 19.5;
the improvement which comprises;
  A. forming a sodium bisulfite compound, as said sodium compound to provide at least a substantial proportion of the alkali needed for the reaction, by adding sodium carbonate, as a dry powder to form a suspension, to methanol within a dissolving vessel and dissolving sulfur dioxide in the methanol to react with the sodium carbonate and form said sodium bisulfite compound in suspension, said sodium carbonate being 55-80 percent by weight of sodium formate when used as 100 percent of the needed alkali, and said sulfur dioxide being 0.5 to 0.9 of the total SO$_2$ used in said reduction;
  B. dissolving sodium formate in water at elevated temperatures and up to maximum concentration to form said aqueous formate solution;
  C. dissolving sulfur dioxide in methanol to form said sulfur dioxide-methanol solution;
  D. providing a puddle methanol solution within said reactor and adding thereto to form said reaction mixture:
    (1) said suspension of said sodium bisulfite compound and said aqueous formate solution according to a first specific schedule of gradual addition within at least the first 60-80 minutes, the sodium bisulfite compound being in an amount such that it is in excess of its solubility in the water, and
    (2) said sulfur dioxide-methanol solution according to a second specific schedule of progressively slower addition, commencing subsequently to said first 60-80 minutes;
  E. allowing reaction of all reagents in said reaction mixture to occur within up to about four hours; and
  F. recovering said anhydrous sodium dithionite from said reaction mixture.

11. The improved process of claim 10 wherein said second specific schedule consists of adding 30-35 percent of said SO$_2$-methanol solution, at a concentration of about 50-65 percent by weight, during the first 15 minutes, 20-25 percent during the next 15 minutes, and the remaining 40-50 percent during the subsequent 30-50 minutes.

12. The improved process of claim 11 wherein said methanol contains about 4 percent to about 8 percent methyl formate and wherein substantial amounts of release gas are generated.

13. The improved process of claim 12 wherein said reduction is conducted at a temperature of 83° C. and a pressure of 50 psig which is controlled by selective release of carbon dioxide from said release gas.

14. The improved process of claim 13 wherein said release gas is passed through a water-cooled condenser at about 30°-40° C., then through a chilled condenser at about −20° C. to about 0° C., and finally through a chilled scrubber fed with methyl alcohol, the condensate from both said condensers and the effluent from said scrubber being returned to said reactor.

* * * * *

UNITED STATES PATENT AND TRADEMARK OFFICE
CERTIFICATE OF CORRECTION

PATENT NO. : 4,218,429
DATED : August 19, 1980
INVENTOR(S) : Logan C. Bostian and Charles E. Winslow, Jr.

It is certified that error appears in the above—identified patent and that said Letters Patent is hereby corrected as shown below:

Column 10, line 7, under Example 2, $SO_2$ line, delete "67 160", insert --67-- under Example 2, and insert --160-- under Example 3.

Column 10, line 9, Example 1, HCOONa line, delete "131 131" and insert --131--; under Example 2, delete "117" and insert -- — --; under Example 3, delete "—" and insert --117--.

Column 10, Table IV, in title, delete "Reocvered" and insert --Recovered--.

Column 10, Table IV, under Materials, delete "Total $CH_3OH$ (added + in-$HCOOCH_3$),(lbs." and insert --Total $CH_3OH$ (added + in-$HCOOCH_3$),lbs.--.

Column 13, line 8, delete "19.5" and insert --1.95--.

Signed and Sealed this

Seventeenth Day of February 1981

[SEAL]

Attest:

RENE D. TEGTMEYER

Attesting Officer    Acting Commissioner of Patents and Trademarks